United States Patent [19]

Mason

[11] 3,743,157

[45] July 3, 1973

[54] TAPE DRIVE APPARATUS FOR CASSETTES

[75] Inventor: Roy Glenn Mason, Santa Clara, Calif.

[73] Assignee: Anderson Jacobson Inc., Sunnyvale, Calif.

[22] Filed: May 1, 1972

[21] Appl. No.: 249,385

[52] U.S. Cl. .................................... 226/195, 242/75
[51] Int. Cl. ............................................ B65h 23/10
[58] Field of Search ................ 226/50, 195; 242/75, 242/75.2

[56] References Cited

UNITED STATES PATENTS

| | | | |
|---|---|---|---|
| 2,913,192 | 11/1959 | Mullin | 226/195 X |
| 3,084,881 | 4/1963 | Wolf | 226/50 X |
| 3,454,204 | 7/1969 | Fieldgate | 226/195 X |

*Primary Examiner*—Richard A. Schacher
*Attorney*—Bruce G. Klaas

[57] ABSTRACT

There is herein disclosed tape tensioning apparatus comprising a spring loaded follower member associated with a pinch roller of the tape drive mechanism and continuously engageable with magnetic tape of a cassette to maintain uniform tension of the tape as it approaches and passes through the recording head.

11 Claims, 3 Drawing Figures

TAPE DRIVE APPARATUS FOR CASSETTES

BACKGROUND AND SUMMARY OF INVENTION

In order to most advantageously use magnetic tape in cassettes in the data processing field, it is necessary to maintain uniform tape speed through the recording head. However, during certain operating conditions, such as start-up and shut-down, the tension on the tape may vary so that a temporary tape loop condition may occur in front of the recording head. As a result, the tape may be driven through the recording head at varying speeds until tape tension is equalized. In addition, tape wear may be increased by non-uniform tape speed.

The primary object of the present invention is to provide tape tensioning means continuously engageable with the tape and instantaneously responsive to changes in tape tension to exert a continuous tensioning force on the tape. To this end, a lightweight tape follower is associated with a pinch roller of the tape drive mechanism and spring biased into engagement with the tape in the cassette to spring load any tape loops so as to permit the tape to be driven through the recording head at uniform speed. In addition, the tape follower and pinch roller are designed to minimize tape wear.

DETAILED DESCRIPTION OF DRAWING

Figures 1, 2, 3:
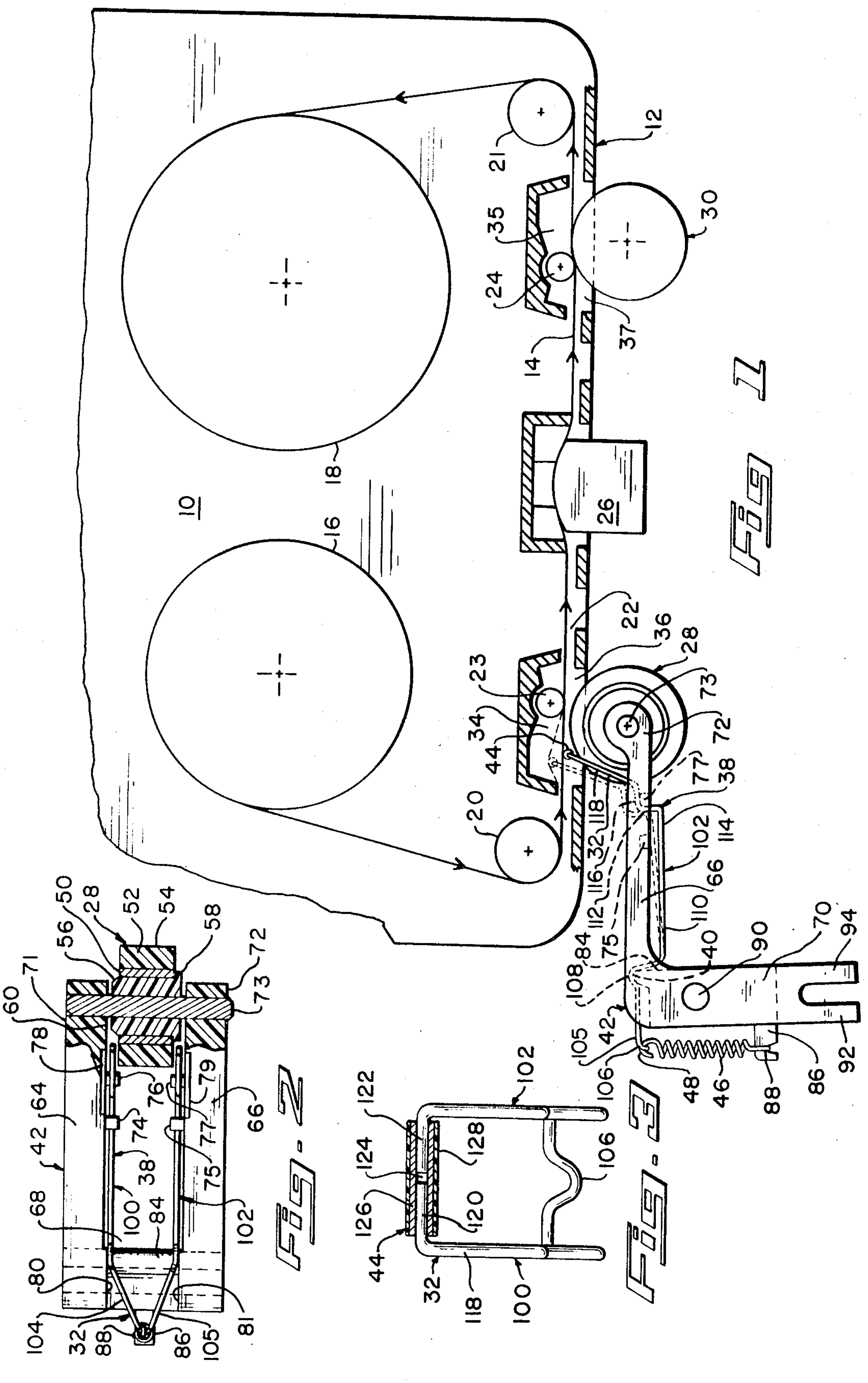
FIG. 1 is a schematic plan view of a conventional magnetic tape cassette mounted in a conventional tape drive deck having the tape tensioning apparatus of the present invention.
FIG. 2 is a side elevational view, partly in section, of the tape tensioning apparatus of FIG. 1 taken in the direction of arrow 2.
FIG. 3 is an enlarged end view of the follower means of the tape tensioning apparatus.

Referring now to FIG. 1, a conventional tape cassette 10 is shown to comprise a casing 12 having a length of conventional magnetic tape 14 having a degree of elasticity permitting it to be elastically stretched under load while being carried by a supply reel 16 and a take-up reel 18. The tape extends around rollers 20, 21 and along a tape slott 22 at the front side of the cassette for association with conventional tape drive mechanism comprising motor driven capstans 23, 24 which extend into the cassette adjacent the slot 22. A recording head 26 and pinch rollers 28, 30 are movable into engagement with the tape in a conventional manner. The tape may be selectively driven forwardly or rearwardly by selective engagement of one or the other of the pinch rollers with the adjacent capstan as by conventional solenoid operating means (not shown).

In the presently preferred form of the invention, tape tensioning means 32 are mounted on each pinch roller for engagment with the magnetic tape within cavities 34, 35 in the cassette normally provided for receiving the pinch rollers through slots 36, 37. Since the apparatus is the same for both pinch rollers only the apparatus of pinch roller 28 is described in detail.

In general, the tape tensioning means comprises a one-piece formed wire tension member 38 pivotally supported at 40 on a pinch roller support arm means 42 and having tape engaging means 44 at the outer end continuously biased into engagement with the tape by spring means 46 attached to the other end at 48. In this manner the outer end of the wire member is movable relative to the roller 28 between a retracted position, closely adjacent the roller, shown in solid lines in FIG. 1, and variably extended postions, one of which is shown in dotted lines in FIG. 1, as permitted by the amount of tension in the tape. The effect of the spring means 46 is to cause the outer end of the wire member to follow the tape so that upon lessening of tape tension due to the drive system, the spring force will instantaneously increase or maintain the tape tension through the tape engaging means by tightening any loop in the tape.

Referring now to FIG. 2, the pinch roller 28 comprises a metallic bearing sleeve 50 having a cast urethane rim 52 of approximately 57 durometer with a ground smooth tape engaging annular outer surface 54 to reduce tape wear. The sleeve 50 is mounted on a plastic hub 56 having an abutment flange 58 at one end and a protruding portion 60 at the other end to provide clearance for adjacent portions of the wire member which straddle the roller.

The support arm means 42 is made of one piece of suitable molded plastic material comprising a pair of spaced parallel finger portions 64, 66 extending generally parallel to the front side of the cassette and defining a gap 68 therebetween within which the roller 28 and the wire member 38 are mounted. One end of the finger portions is integrally fixed to a transversely extending support portion 70 and the other end terminates in pin hubs 71, 72 supported cantilever fashion in general alignment with slot 36. A pin 73 is mounted in the pin hubs 71, 72 and rotatably supports the roller hub 56. Oppositely aligned pairs of wire member holding lugs 74, 75 and 76, 77 are integral with the finger portions 64, 66 and extend into the gap 68 adjacent relief slots 78, 79. The gap 68 is extended across the end of the flange portion, as indicated by side walls 80, 81, and a pivotal support means for the wire member is provided therebetween by an elongated rounded shoulder 84, FIG. 1, which extends across the gap 68 and freely pivotally supports the wire member. An integral spring attachment lug 86 extends transversely from the support portion opposite the finger portions 64, 66 and the other end of spring means 46 is attached thereto at 88. The roller support arm means is pivotally mounted on a pin 90 for movement between an engaged position with the pinch roller holding the tape against the capstan, shown by roller 30 in FIG. 1, and a retracted position shown by roller 28. The pivotal movement is effected by solenoid means (not shown) engageable with actuating fingers 92, 94 at the end of the support portion 70.

Referring now to FIGS. 2 and 3, the tension member comprises a piece of formed 0.02 inch diameter music wire having a pair of generally parallel rail portions 100, 102, spaced apart a distance slightly less than the width of gap 68 so as to be generally located therewithin between the side walls 80, 81. The rail portions are integrally conneced at one end by converging end portions 104, 105 centrally connected by a semicircular loop 106 to which one end of the extension spring 46 is attached. It will be understood that the rail portions are generally identical and the configuration thereof is hereinafter described by reference to only one rail. Semicircular pivot loops 108 pivotally mount the tension member on the rounded shoulder 84 and connect the converging end portions to intermediate straight portions 110 which extend to a transverse portion 112 extending between the lugs 74, 75 and 76, 77 so that offset wire portions 114, 116 will engage the lugs in the extreme pivotal positions of the wire member. Thus, the adjacent side surfaces of lugs 76, 77 provide stop means locating the tension member in the fully retracted position, relative to the tape, and the adjacent side surfaces of lugs 74, 75 provide stop means locating the tension member in a fully outwardly extended position relative to the tape. The end portions 118 of the tension member extend outwardly toward the cassette at an angle relative to the finger portions, so as to be generally tangential to the outer periphery of the roller and terminate in transverse inwardly extending coaxial terminal portions 120, 122, FIG. 3, spaced by a gap 124. A tape abutment means may be mounted on portions 120, 122 and comprises a non-magnetic inner sleeve portion 126 having an outer coating 128 of low friction material such as Teflon S.

In operation, the tape engaging means is biased outwardly by spring 46 into continuous abutting engagement with the cassette tape 14 adjacent roller 28. In normal operation, the tape tension will be relatively low and the tension member will be in a position generally corresponding to that shown by the broken lines of FIG. 1. Whenever the tension on the tape is momentarily increased, as during start-up, the tape loop will be straightened with the tape tensioning means being forced toward the roller member against the bias of the extension spring.

The tape tensioning means is particularly effective during start-up when the relatively lightweight length of tape between the capstan and the supply reel will be brought to the normal operating speed more quickly than the relatively heavy weight supply reel with the result that the length of tape between the capstan and the supply reel will be elastically stretched and then released so as to tend to form loops or slack in the length of tape until uniform operating speed has been attained in the system. The operation may be such that there will tend to be several surging movements of the tape caused by a repetition of the cycle of (1) the tape being stretched after reaching the operating speed while the reel reaches operating speed, (2) then, as the reel reaches and goes beyond operating speed, the tape will become momentarily slack to cause a momentary decrease in reel speed, and (3) the tape again being stretched, although a lesser amount, to bring the reel back again to operating speed.

I claim:

1. In a drive system for magnetic information storage tape having a magnetic head operatively engageable with said tape and drive means for moving the tape past the magnetic head, the improvement of:

- pinch roller means engageable with said tape after reaching said magnetic head to engage the tape with said drive means and create tension on said tape causing its movement past the magnetic head,
- tension means movably mounted on and carried by said pinch roller means in constant engagement with said tape before the tape reaches said magnetic head and movable relative thereto to forcibly engage the tape and maintain a constant tensioning force on said tape, and
- spring means movably urging said tension means into constant engagement with said tape.

2. The invention as defined in claim 1 and wherein said tension means comprises a member centrally pivotally mounted on said pinch roller means for pivotal movement relative to said tape, one end of said member engaging said tape, and the other end of said member being spring biased to force said other end of said member into continuous engagement with said tape.

3. The invention as defined in claim 1 and said tape being mounted in a cassette having an opening for receiving said tension means, and said tension means being pivotally mounted externally of said cassette and extending into said opening.

4. The invention as defined in claim 1 and wherein said tension means comprises a single piece of formed wire mounted on the pinch roller means of said drive system and having:

- a pair of parallel leg portions adapted to straddle said roller means,
- a tape abutment portion at one end of said leg portions engageable with said roller means in a fully retracted postion and movable outwardly therefrom to variably spaced tensioning positions,
- a spring attachment loop at the opposite end of said leg portions beyond said pivotal loop portions, and
- a spring attached at one end to said roller means and at the other end to said spring attachment loop to bias said tape abutment portion toward the tensioning positions.

5. The invention as defined in claim 4 and wherein said tape abutment portion having an abutment sleeve mounted thereon.

6. The invention as defined in claim 5 and wherein said abutment sleeve comprises a non-magnetic inner support portion and an anti-friction tape engaging outer portion.

7. In a magentic tape drive system, having a pair of movable pinch roller means alternately operative for pulling magnetic tape past a recording head, the improvement of tensioning means mounted on and carried with said pinch roller means and movable relative thereto and continuously engaging said tape and being biased into engagement with said tape so as to maintain continuous tension on said tape.

8. The invention as defined in claim 7 and wherein said tensioning means comprises a single piece lightweight formed wire member.

9. In a drive system for magnetic information storage tape carried in a cassette by spaced reels on which the tape is wound and between which the tape is transferable with an unwound length of the tape extending between the reels, the system comprising a recording head engageable with a portion of the unwound length of tape, a forward driving capstan and a reverse driving capstan located on opposite sides of said recording head adjacent one side of the unwound length of tape, a pinch roller located adjacent each capstan on the opposite side of the unwound length of tape and being movable relative thereto between an idle position in spaced relationship thereto and a drive position holding the unwound portion of the tape in driven engagement with the adjacent capstan to pull the tape from one of the reels across the recording head, the improvement of:

- tape tensioning means mounted on and movable with and relative to said pinch roller and operative in the idle position to engage a portion of the unwound length of tape prior to reaching the recording head to maintain substantially constant uniform tension on and speed of the tape across the recording head.

10. The invention as defined in claim 9, and wherein said tape tensioning means comprises an elongated arm member pivotally mounted on said pinch roller, tape engaging means on one end of said arm member, and spring means on the other end of said arm member continuously biasing said tape engaging means against the unwound portion of said tape.

11. The invention as defined in claim 9 and wherein said elongated arm member being made from a single piece of relatively lightweight wire material so as to be substantially instantaneously responsive to changes in tape tension to maintain a substantially constant tensioning force on said tape.

* * * * *